United States Patent [19]
Symons et al.

[11] 3,908,001
[45] Sept. 23, 1975

[54] MANUFACTURE OF CHLORINE HYDRATE

[75] Inventors: Philip C. Symons; Harry K. Bjorkman, both of Birmingham, Mich.

[73] Assignee: Energy Development Associates, Madison Heights, Mich.

[22] Filed: Nov. 18, 1971

[21] Appl. No.: 200,047

[52] U.S. Cl. ............... 423/472; 423/462; 423/500
[51] Int. Cl.² .......................... C01B 7/02
[58] Field of Search .......... 423/472, 503, 500, 491, 423/462; 23/295; 136/86 A, 6 R

[56] References Cited
UNITED STATES PATENTS

| | | | |
|---|---|---|---|
| 2,035,990 | 3/1936 | Siegler | 23/295 |
| 2,570,612 | 10/1951 | Vahl | 23/295 X |
| 2,656,011 | 10/1953 | Frey | 423/500 |
| 2,785,055 | 3/1957 | Redcay | 423/500 |
| 3,044,862 | 7/1962 | Paul | 423/500 X |
| 3,678,696 | 7/1972 | Cheng et al. | 23/295 X |
| 3,713,888 | 1/1973 | Symons | 136/6 |

OTHER PUBLICATIONS

J. W. Mellor's "A Comprehensive Treatise on Inorganic and Theoretical Chemistry,"Vol. 2, 1922 Ed., pp. 72 and 73. Longmans, Green & Co., New York.
Supplement to J. W. Mellor's "Comprehensive Treatise on Inorganic and Theoretical Chemistry,"Suppl. II, Part I, 1956 Ed., p. 364, Longmans, Green & Co., New York.

*Primary Examiner*—Edward Stern
*Attorney, Agent, or Firm*—B. F. Claeboe; Richard P. Mueller; Arthur E. Kluegel

[57] ABSTRACT

Chlorine hydrate is made by vaporizing liquid water to gaseous form, mixing it with gaseous chlorine and contacting the mixture with a low temperature heat transfer means which converts it to solid chlorine hydrate. The liquid water to be converted to gaseous form is most preferably that present in an aqueous metal chloride electrolyte employed in an electric battery of the metal electrode-metal chloride electrolyte-chlorine electrode type, the chlorine is also obtained from the battery, during charging thereof, and the chlorine hydrate produced is reconverted to chlorine and returned to the battery when it is being discharged.

An apparatus for producing chlorine hydrate may be simply constructed, containing means for adding water (preferably in an aqueous halide solution) and chlorine to an apparatus reaction zone, means for vaporizing water and mixing it with the chlorine and cooling or refrigerating means for cooling the mixed chlorine and water vapors to form chlorine hydrate. The apparatus and method are adapted for the continuous feeding of sources of chlorine and water so as to continuously produce the desired chlorine hydrate.

6 Claims, 5 Drawing Figures

US Patent   Sept. 23, 1975   3,908,001
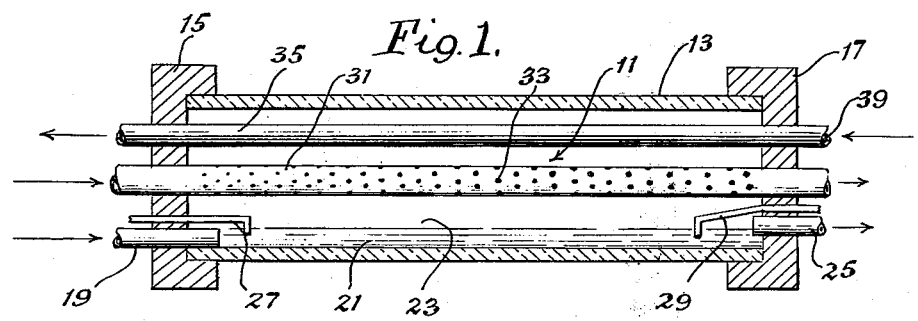
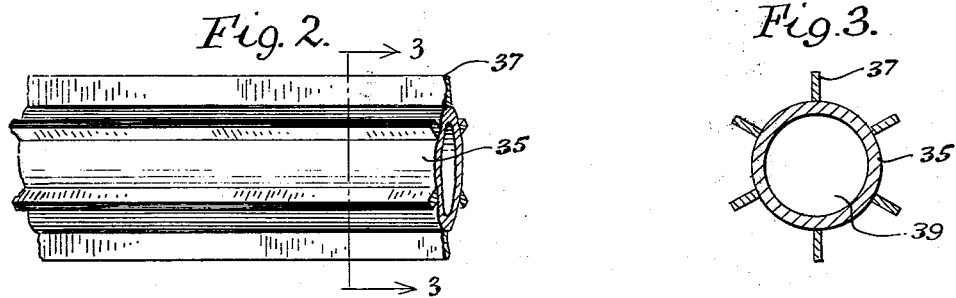
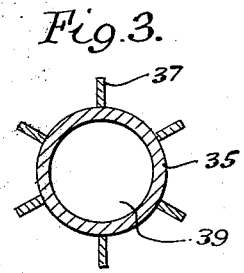
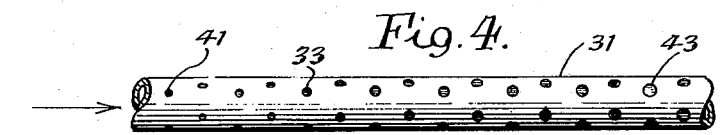
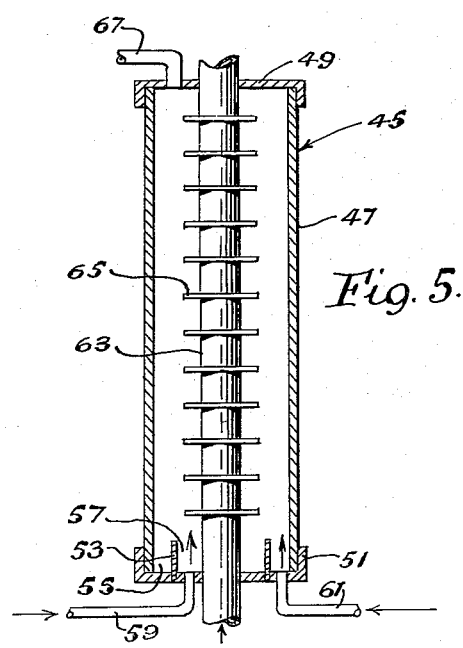

0

MANUFACTURE OF CHLORINE HYDRATE

BACKGROUND OF THE INVENTION

Chlorine hydrate, $Cl_2 \cdot 8H_2O$, is a known compound which is producible from chlorine and water at low temperatures. This hydrate is a crystalline solid at temperatures below about 9°C. and when raised above such temperature, decomposes to water and chlorine. In U.S. Pat. application, Ser. No. 50,054 for HALOGEN HYDRATES filed June 26, 1970 U.S. Pat. No. 3,713,888 which is hereby incorporated by reference, the use of chlorine hydrates as a source of chlorine for the discharging reactions of a high energy density battery having an aqueous metal chloride electrolyte between metal and chlorine electrodes was described. Also disclosed in the mentioned application was the production of the chlorine hydrate by contact of cooled chlorine gas with an aqueous zinc chloride solution.

Although chlorine hydrate and comparable halogen hydrates such as bromide hydrate and iodine hydrate are useful sources of halogens for charging of high energy density batteries based on metal electrodes, metal halide electrolytes and halogen electrodes, and the described method of Ser. No. 50,054 is capable of producing satisfactory halogen hydrates, there are some disadvantages associated with the method and, therefore, the present inventors have attempted to perfect it or discover an alternative and superior process. Among the more important disadvantages previously encountered was the requirement that the zinc chloride or comparable metal chloride solution should be at a concentration below a certain point (25 percent, in the case of zinc chloride); otherwise, the halogen hydrate would not be satisfactorily made. Filtration problems were also encountered in removing the halogen hydrate from the metal halide solution and in separating the halogen hydrate crystals from the filtering medium or means. By following the present method, such problems are essentially avoided, because the halogen hydrate is not produced in contact with metal halide solution nor is it brought into such contact.

SUMMARY OF THE INVENTION

In accordance with the present invention chlorine hydrate is made by vaporizing liquid water to gaseous form, contacting said gaseous water with gaseous chlorine and contacting said mixture with a heat transfer means of a temperature low enough to convert the gas mixture to chlorine hydrate in solid form. In preferred embodiments of the invention, the heat transfer means contains a refrigerant at a temperature of −50° to +9°C., the liquid water is obtained from an aqueous metal chlorine solution, e.g., aqueous zinc chloride, the gaseous chlorine is obtained at least in part from the metal chloride solution and both the metal chloride solution and the chlorine are effluents from a high energy density battery. Also in preferred operations, the feeds of the sources of water and chlorine are continuous and the chlorine hydrate is produced continuously. The apparatus embodiments of the invention include means for bringing together the chlorine and water, means for vaporizing the water and means for cooling the mixed water and chlorine vapors so as to convert them to halogen hydrate at a site out of contact with aqueous metal halide solution. Broadly, an apparatus for making chlorine hydrate comprises a walled reaction zone in which the chlorine hydrate is formed, inlet means for the entry of reactant(s) into the reaction zone, outlet means for the withdrawal of reactants from said zone, means for vaporizing water in said zone, and cooling means in said zone for cooling a mixture of chlorine gas and water vapor inn said zone and converting it to chlorine hydrate on a surface of said means.

DESCRIPTION OF THE PREFERRED EMBODIMENTS

The present invention and its mode of operation will be apparent from the following description, taken in conjunction with the accompanying drawing, in which:

FIG. 1 is a cutaway and partially sectioned side elevational view of an apparatus for producing chlorine hydrate from chlorine and water or aqueous solution;

FIG. 2 is a partial elevational view of a heat transfer (refrigerating) tube on which halogen hydrate is formed, showing longitudinal fins thereon;

FIG. 3 is a sectional view along plane 3—3 of FIG. 2;

FIG. 4 is an enlarged view of a portion of tubular means for passing chlorine into the reaction zone of the apparatus of FIG. 1 and distributing it therein, illustrating variations in sizes of perforations in the tube as it traverses the reaction zone; and FIG. 5 is a partially cutaway elevational view of a vertically positioned apparatus for producing chlorine hydrate, illustrating annular flows of reactants and a horizontally finned refrigerating tube centrally positioned in the apparatus.

In FIG. 1 a reactor or walled reaction zone 11 is defined by cylindrical wall 13 and end caps 15 and 17, each of which has openings in it for admission and/or removal of reactants, product(s), heat transfer means and vaporization means. The caps are sealed tightly enough about the reactant, in preferred embodiments of the invention, to make the reaction zone gas tight. Inlet tube 19 carries liquid water 21 or aqueous salt solution, preferably a metal salt solution, such as zinc chloride, from a high energy density battery (not illustrated) electrolyte to the reaction zone or the reactor. It forms a pool at 23 is maintained by the height of the outlet tube 25 or a restriction placed in said outlet or elsewhere in the reaction zone. Thus, a weir, not shown, could be included in the portion of the reactor near the outlet to regulate the height 23 of the pool of liquid 21. As illustrated, the outlet tube 25 for the liquid 21 might not be gas tight, but this can be corrected by various means, not illustrated, such as a U-tube, bends in the tubing and pressure control means.

Electrodes 27 and 29, which dip into the liquid are connected to a source of electricity, which enables them to heat the liquid and promote vaporization thereof to the gaseous state. Instead of utilizing such electrodes, other forms of heaters, including electric resistance heaters, steam or hot water-containing circulation coils, hot air heating, high frequency or induction heating and infrared radiation heating may be employed. Also, other techniques of providing moisture are useful, such as external generation of moisture vapor as steam or more preferably of a heated aqueous metal halide solution. Generally the rate of vaporization of the aqueous liquid will be sufficient for 0.01 to 12 moles of water to accompany one mole of chlorine.

Above the water and the heating means is illustrated a perforated pipe 31 through which chlorine enters the reaction zone. As shown, the chlorine passes from the pipe to the zone through a series of perforations therein, which increase in diameter as they approach the downstream end of the pipe. By such a design, approximately equal flows of chlorine gas occur throughout the length of the reaction zone. By inclining the holes 33 in tube 31 the gas may be given a swirling or tangential motion about the reaction zone, so as to favor mixing in with the moisture vapor being generated from the pool of liquid at the bottom of the zone.

Farter above the other tubes and heating means are a heat transfer means, shown as a cooling means or refrigerating tube 35, on which chlorine hydrate forms. As illustrated in FIG. 1, the path of the refrigerating fluid through such tube is countercurrent to the direction of flow of chlorine and water through the horizontal reaction zone of the apparatus. This is to make certain that the temperature is lowest where the concentrations of chlorine and water could tend to be less, thus favoring the production of chlorine hydrate in a downstream end of the apparatus where, otherwise, little might be formed. As shown, the refrigerating tube is not finned but finned tubes and others of designs for assisting in transferring heat and holding the chlorine hydrate thereon after formation may usefully by employed. Also, as FIG. 1 illustrates, the chlorine pipe extends through the horizontal reaction zone but in many cases it may be desirable to have the chlorine enter the zone at one end and leave at the other, if not consumed, with no connecting pipe between.

The feeds to the apparatus of FIG. 1 preferably come from a high energy density battery having a zinc or other metal electrode, an aqueous zinc chlorine or other metal chloride electrolyte and a chlorine electrode. Preferably, the chlorine will be charged as a gas through tube 31, which gas would have been separated from electrolyte from the battery effluent during a charging period. The electrolyte ion, will be fed in instead of water, and will carry with it some dissolved or dispersed chlorine gas, which will be released from the electrolyte by heating or with the assistance of vacuum, sometimes accompanied by mechanical effects, e.g., agitation, diaphragm passage, sorption. Such released chlorine will mix with other chlorine added (that being generated at the positive electrode), and will contact moisture vapor and the refrigerating coil to form the chlorine hydrate. Instead of feeding the reactants directly from the high energy density battery, they may be temporarily stored, separated or otherwise treated before being fed to the hydrate-forming apparatus. In addition to taking feed from the high energy density battery, the apparatus desirably feeds chlorine hydrate or chlorine and water obtained from such hydrate back to the battery. Thus, a balance of chlorine and water is maintained so as to favor keeping the zinc chloride electrolyte at a desirable concentration. Note that the moisture removed to form the chlorine hydrate increases zinc chloride concentration in the solution but because this was depleted during charging, the zinc chloride does not precipitate, even if the solution fed to the cell during charge was concentrated. Similarly, on discharge of the battery the water from the hydrate performs a desirable diluting, to prevent precipitation of $ZnCl_2$.

Various means may be utilized to maintain proper circulation of the gases in the hydrate-forming apparatus but because these are conventional, most of them are not specifically illustrated. They include fans, blowers, circulators, baffles, guides, directed passages, etc.

In FIG. 2 there is illustrated a modification of the refrigerant tube design of FIG. 1. On tube 35, through which refrigerant 39 flows, there is a plurality of fins 37. These improve heat transfer characteristics, enabling the operation of the apparatus continuously with feeding of liquid water and chlorine and removal of any excesses of these products (plus recirculation, if desired) for longer periods of time. In the particular designs of the tubes illustrated in FIG'S. 1–3 they do not include any means for continuously removing halogen hydrate accumulations from refrigerating means and therefore, it is desirable for the process to be operative for as long a period as possible so as to minimize the need for periodic dismantlings of the apparatus and removals of the chlorine hydrate crystals. Of course, in many commercial designs of this apparatus means are provided for periodically shaking off the crystals from the refrigerating tube 35 and having them fall onto moving belts or other withdrawing means which allow removal of the chlorine hydrate crystals without contact thereof with the liquid water or aqueous salt solution, from which they would otherwise have to be separated by filtration or other technique. Thus, the apparatus of FIG'S. 2 and 3, by means of the fins which project therefrom, has a larger cooling surface, which surface helps to hold the hydrate in position and prevent it from accidentally dropping into the liquiid water or salt solution. Of course, the material of construction of the refrigerating means should be sufficiently conductive to rapidly extract heat from the chlorine and water to produce the hydrate, and should be resistant to the corrosive effects of the reactants. Desirable condutors are metals and of these the best is considered to be titanium, although glass, tantalum, and other alloy resistant to wet chlorine may also be used successfully. Because of the expense of titanium, sometimes the refrigerating tube will be copper or another useful conductive metal which is externally clad with titanium or similar chlorine-resistant conductive coating. In some instances, suitable plastics may be employed, but they are often less satisfactory than the corrosion-resistant metals because of their poor heat transfer characteristics.

Instead of employing tubes of the design shown, other equivalent heat transfer means may be utilized, in which the refrigerating fluid passes through the shell section and the reagents pass through the tubes. Similarly, mixed shell and tube designs may be used and several or many tubes may be employed for their cooling effects. Also, pluralities of water or aqueous solution inlets and chlorine inlets may be present so long as the ultimate effect obtained is to contact a mixture of gaseous chlorine and water at a sufficiently cold surface to form chlorine hydrate.

In FIG. 4 are shown small openings 41, medium sized openings 33 and large opening 43 in chlorine introduction tubes 31. Instead of passing the entering chlorine into a tube such as that illustrted, with the plurality of sizes of holes which increase in diameter toward the downstream end, one can obtain fairly even distribution of chlorine over the length of the reaction zone by using openings all of approximately the same size but with more of them located downstream. In some cases, where there is sufficient circulation and the chlorine and water feeds are balanced and produce a mixture thereof in the 0.01 to 12:1 $H_2O:Cl_2$ molar range, it is not required to have a special distributor such as tube 31, but the chlorine may be admitted at one end and any excess can be withdrawn at the other end of the reactor. In such cases, it may be desirable to employ baffles or directed entry passageways which promote a good mixing of the chlorine and water vapor.

In FIG. 5 is shown a reactor 45 for the production of chlorine hydrate which includes a vertical tubular, preferably cylindrical portion 47, upper closure 49 and lower cap or closure 51. The lower closure has an internal annular wall 53 separating it into inner and outer inlet sections 55 and 57. Chlorine gas, which may be moist, is fed through inlet pipe 59 and steam or water vapor is fed into annular outer portion 55 through tube 61. The inlets of pipes 51 and 61 may be so directed as to promote good mixing of the two gases and they may be given a swirling motion in an effort to bring them into repeated contact with refrigerating tubular means 63, which has horizontal circular fins 65 affixed to it. Any unreacted gases are removed through outlet 67. Again, as in the case of the finned cooling means of FIG. 2, the fins improve heat transfer, serves as shelves to support the chlorine hydrate and allow the process to be operated continuously for a greater period of time before shutdown is necessitated to remove the product. Although the fins are desirable for these purposes, the chlorine hydrate does tend to adhere strongly to the cooling means, providing that the temperature of the cooling fluid is not raised above 9°C. and therefore, the apparatus can be utilized without fins. If desired, the fins may be spirally wound about the heat transfer tube or may be periodically interrupted or changed in direction to promote initmate contact of the chlorine and moisture vapor with the cooling means. Also, under some circumstances the chlorine may be admitted to the external portion of the reactor and the vapor to the internal portion or both may be admitted in the same section and the annular divider members 53 may be omitted.

Mechanical means for automatically removing the chlorine hydrate formed from the refrigerating means have not been illustrated but many such devices are available which periodically will shake or brush off the surfaces on which the hydrate has formed and then will collect and transport the product out of the reactor. With the apparatus illustrated, an end portion may be removed and the tubular section may then be taken off, exposing the refrigerating means onto which the halogen hydrate has adhered. It is a simple matter then, to remove the crystals from the cooling coil by vibrating it, scraping them off or brushing them off into a receptacle. A glass viewplate may be incorporated in the reactor wall so as to allow visual observation of hydrate buildup on the refrigerating means.

It is considered that from the foregoing description most of the mechanical aspects of the utilization of the apparatus are evident and, therefore, these will not be referred to at length in the following description of the operation of the invented method and the corresponding apparatuses.

In operation, a source of water to be converted to gaseous form is either passed into the described apparatus or is converted to such gaseous form external to the apparatus. To eliminate unnecessary equipment, it is preferred that the mentioned conversion be conducted in the apparatus for making chlorine hydrate. Vaporization is effected by heating, vacuum, heating plus vacuum application or other equivalent means. For example, it is possible to spray droplets of water or aqueous solution into an atmosphere of chlorine to evaporate the water, or to spray live steam, generated external to the present apparatus from water of other aqueous solutions with care taken that the steam distribution is such that is is thoroughly mixed with chlorine before contacting the refrigerating means. It is also possible to utilize very finely divided sprays of water in the hydrate former, as from nebulizers or foggers, but these have a disadvantage in that the droplets may more readily condense to water and freeze at the refrigerating means before forming the desired chlorine hydrate. Dry or moist chlorine may be employed and sometimes the water vapor produced will contain a proportion of liquid water carried along with it in very finely divided form. Whatever the nature of the physical form of the reagents, some, and preferably a major proportion of both the water and the chlorine will be in the gaseous form as this mixture approaches the refrigerating means. Also, the temperature of the mixture will be as low as feasible so as to encourage hydrate formation. Thus, the water vapor will not usually be generated from a solution that is over 80°C. in temperature and preferably, the temperature of the solution will be from 15° to 60°C., as in utilizing an apparatus of the type shown in FIG. 1 or equivalent thereto.

An alternative apparatus than that of FIG. 1 may also be used. It is one that does not have inlet tube 31. In this situation, the moisture vapor may be produced by vaporization of the aqueous solution 21 or may be externally produced and inserted through chlorine inlet 19. This can be performed by introducing an aqueous liquid through inlet 19 at a temperature neat its boiling point or no less than about 40°C. below its boiling point. With a 35 percent by weight zinc chloride solution, the vapor pressure at 100°C. is about 655 mm Hg.

In the continuous use of the apparatus of FIG. 1 (although batch operations may be used), the rate of liquid flow may range from about 0.1:1 to about 10:1 with the rate of water removed to form hydrate controlled by the temperature and dispersion geometry of the apparatus. The molar ratio of chlorine injected to chlorine absorbed is about 1-2:1, preferably 1.1:1 with the chlorine not absorbed being recirculated.

In continuous methods which are preferably employed, although batch operations are feasible, the rates of flow or flow plus moisture vapor generation will be controlled so as to maintain the molar ratios of water vapor to chlorine gas in the preferred 0.01 to 12:1 range and most preferably, about 0.04 to 1:1. When feasible, operation at about atmospheric pressure is preferred, ± 0.2 atmosphere, but operations at pressures as low as 0.1 atm. can be satisfactorily undertaken. Pressure as high as 9 atmospheres may be employed.

The various parts of the apparatus will preferably be of titanium or other conductive and chlorine-resistant material, where good conductivity is required, as in the refrigerating tube, but other chlorine-resistant parts, such as after-chlorinated polyvinyl chloride, polytetrafluoroethylene and acrylonitrilebutadiene-styrene resins may be used for parts of the equipment that do not require good heat transfer, such as the shell, inlet and outlet tubing and the chlorine distributor and end caps.

Various refrigerants may be employed, including brine solutions, halogenated hydrocarbons, ammonia and sulfur dioxide. Of these, the brine solutions and the halogenated hydrocarbons, especially the fluorinated or chlorofluorinated lower hydrocarbons, (Freons, Ucons, Genetrons), are preferred. The temperature transmitted to the gaseous chlorine-water mixture of −50° to +9°C., preferably −30° to +9°C. In the most preferred operations the temperature will be in the range of −10° to +7°C. Sufficient refrigerant should be flowed through the system, in either the countercurrent direction indicated or concurrently, so as to maintain the desired low temperature at the points of contact of the chlorine-water vapor mix with the cooling means.

When the source of water vapor and also, of some of the chlorine, is electrolyte from a high energy density battery, it is preferred to utilize zinc chloride electrolyte containing some chlorine dissolved or dispersed in it. Generally, from 0.1 to 3–4 volumes of chlorine will be in the electrolyte and it will contain at least 10, preferably more than 15 percent of zinc chloride, with the upper limit on zinc chloride being about 50 percent (48.6 percent is the theoretical limit at ambient conditions in a zinc chloride hydrate system).

When the feed to the chlorine hydrate generator is obtained from the charging of batteries, which may vary the amounts of chlorine and electrolyte available, it will be desirable to hold the moisture: chlorine molar ratio of about 8:1 or in the 8:1 to 5:1 range. This may be done by including in the apparatus means responsive to the flow of chlorine or chlorine-containing solution into the system which increases the production of water vapor by increasing the heating of the water or salt solution, by decreasing the pressure in the system or by feeding in more steam, as may be most appropriate. Such temperature, pressure and flow control means, responsive to other flows, are well known in the art and are not illustrated in the accompanying drawing because they are conventional. Of course, the total feed of chlorine to and the vaporization of water in the reactor will be adjusted for maximum efficiency and capacity. In such cases, the chlorine feed and water vaporization will be increased or decreased together, usually as one of these is varied due to the process conditions beyond the control of the equipment operator.

The advantages of the invention over prior art methods of making chlorine hydrate are significant. Especially when the source of water is an aqueous zinc chloride or other metal chloride electrolyte, which may also supply some of the chlorine, savings are made in equipment and operations are avoided. Thus, because the moisture is out of contact with the metal chloride solution when the chloride hydrate is formed, no filtration is needed and there is no upper limit on the concentration of the electrolyte that may be used, as is the case when the temperature of the zinc chloride electrolyte is lowered and chlorine gas is bubbled through it. During the cooling of the gas in contact with already solidified chlorine hydrate, the condensation of some water vapor to a thin film of liquid water on the surface of chlorine hydrate provides a renewed surface for absorption of the ideally located chlorine thereon and formation of the hydrate. Thus, the rate of reaction is improved. Additionally, the present apparatus is much simpler and requires fewer operating steps than would be needed if the prior art method of producing chlorine hydrate by reaction of chlorine and cold liquid water were to be followed.

The following examples illustrate the operation of the invention. All parts are by weight and temperatures are in °C. unless otherwise indicated.

EXAMPLE 1

Utilizing the apparatus illustrated in FIG. 1, with all parts made of chlorine-resistant materials, e.g., polytetrafluoroethylene or glass, except for the refrigerating tube and the electrodes, which are of titanium, chlorine hydrate is produced from a feed of chlorine gas (from the charging of a high energy density battery of the zinc-zinc chloride-chloride type) and aqueous zinc chloride electrolyte at a concentration of about 15 percent of zinc chloride, by weight and introduced with about two volumes of chlorine gas per volume of electrolyte. Gas is introduced through tube 31; the holes are inclined to promote swirling mixing and the feed rates of chlorine and vaporization rates of liquid water are controlled to maintain the gas in the reactor at about 0.16:1 moisture:chlorine molar ratio. The coolant brine is supplied at a temperature of about −6°C. and the electrolyte temperature is maintained in the range of 40° to 42°C. Chlorine from both the gas and electrolyte charged is absorbed at the cooling coil into moisture that has condensed thereon and greenish yellow solid crystals are formed on the heat transfer surface. Analysis verifies that the product is principally chlorine hydrate of the formula, $Cl_2 \cdot 8H_2O$, with a small proportion of water present.

When the operating conditions are varied, so that the zinc chloride solution temperature is 70°C. and the refrigerant is at −7.5°C., the production rate of chlorine hydrate is significantly increased to about twice that previously noted.

In the operation of the apparatus described, the flows of chlorine and liquid water (in aqueous salt solution) are continuous and when the flow of chlorine is increased to 20 percent more than that at the beginning of the operation, the rate of water vapor generation is increased accordingly by increasing the voltage applied to the heater leads so as to maintain the $H_2O:Cl_2$ molar ratio of about 0.5:1.

When the same operation is repeated, without the chlorine distributor (tube 33), hydrate production is also obtained. The rate of production is down and the product contains some ice crystals, but is generally acceptable. Similarly, when liquid water is used instead of zinc chloride solution, the method is also satisfactorily operative. In some embodiments of the invention, steam is supplied as the heating means and occasionally raw steam (wet or dry) is utilized for this purpose so that the moisture contacting the chlorine at the cooling means may be introduced into the apparatus as a gas. Production of the hydrate is satisfactory in such changed processes, providing that the method described is utilized. When a finned tube, coil or bundle is substituted, efficiency of hydrate production is increased and approximately twice as much hydrate is depositable on each finned tube before the equipment is shut-down to remove it.

Which ever of the apparatuses or methods of the present invention is employed, when the liquid charged is depleted aqueous zinc chloride electrolyte solution, the chlorine hydrate produced is held as a source of chlorine which is then returned to the battery during discharge. A description of a type of battery in which the chlorine is used and from which electrolyte is obtained may be found in our U.S. Pat. application, Ser. No. 50,054, previously mentioned.

EXAMPLE 2

The apparatus of FIG. 5, as described in the previous specification is utilized, with all the parts thereof being of stainless steel, lined with Teflon, except for the refrigerating means, which is titanium clad copper tubing with titanium fins thereon. The refrigerant employed is dichlorodifluoromethane and its temperature is maintained at about 0°C. Steam is injected through the outermost inlet line and chlorine gas through the other line. The steam is at a temperature of 100°C. and the chlorine is at 15°C. Both are at approximately atmospheric pressure plus increments sufficient to produce the desired flow rates. The inlet lines are so directed as to give the mixed gases a swirling or turbulent motion and bring them into contact with the cooling tube throughout the length of the reactor. The rate of flow of steam and chlorine is regulated by external valves and/or flow responsive mechanisms, not shown, so as to be in the range of 8:1 to 0.5:1 water:chlorine molar ratios. After several hours of operation the flows of reactants and withdrawals of the unused portions thereof are halted, the equipment is dismantled by removal of the top cap and the cylindrical wall member and the hydrate is scraped off into a refrigerated storage box. When analyzed, it is verified that chlorine hydrate, $Cl_2.8H_2O$, has been produced.

Following the above procedure, an analysis of vapor pressure — molar ratio was undertaken to determine the optimum rate of chlorine hydrate production. The results are shown below. The results show that if the molar ratio of chlorine to water is much above 8:1 (say not higher than 12:1), the flow of coolant may not be sufficient to control the formation of hydrate which is of importance in a battery. The data shows a preferred molar ratio of about 0.5:1.

TABLE I

| Vapor Pressure in Apparatus | $H_2O/Cl_2$ Molar Ratio | Coolant Temp. Inside Cooling Tube | Chlorine Absorption Rate Mols/m²/hr. |
|---|---|---|---|
| 668 mm | 8:1 | Unable to Maintain | Very high |
| 230 mm | 0.44:1 | −6°C. | 27 |
| 150 mm | 0.245:1 | −6°C. | 20.5 |
| 97 mm | 0.165:1 | −6°C. | 15.7 |
| 58 mm | 0.084:1 | −6°C. | 7.6 |
| 32 mm | 0.044:1 | −6°C. | 4.9 |

The invention has been described with respect to illustrations and examples of embodiments thereof. It is to be understood that the invention is not limited to the specific embodiments described and shown, since it is evident to one of skill in the art, that equivalents and substitutes may be employed for elements of the invented apparatus and process without departing from the spirit of the invention or going outside its scope.

What is claimed is:

1. A method for forming chlorine hydrate which comprises vaporizing aqueous zinc chloride solution having a concentration greater than 10 percent zinc chloride with 0.1 to 4 volumes of chlorine dissolved and/or dispersed therein to form a gaseous form of water and chlorine and contacting said mixture of gases with a heat transfer means at a temperature between about −50° to about +9°C to convert the gas mixture to chlorine hydrate in solid form, the molar ratio of water and chlorine in gaseous form contacting the heat tranfer means being from about 0.01 to about 8:1 and further providing that the aqueous zinc chloride solution containing disolved and/or dispersed chlorine gas is electrolyte from a zinc, chlorine, aqueous zinc chloride battery during the charging phase of the battery.

2. A method according to claim 1, wherein gaseous chlorine, released from aqueous zinc chloride, is continuously fed into a hydrate-forming zone, water vapor is continuously formed by vaporization of the liquid water, chlorine hydrate is continuously formed, the feed of chlorine and the vaporization of water are regulated to maintain a molar ratio of about 1:1 and the temperature of the heat transfer means, said heat transfer means and the feed of chlorine and vaporization of water are increased or decreased together to maintain said molar ratio.

3. A method according to claim 1, wherein both the gaseous chlorine and the liquid water utilizied are obtained from an aqueous metal chloride solution in which the gaseous chlorine is at least partially dissolved and/or dispersed, vaporization of the liquid water to gaseous form is effected by heating it, the proportions of water and chlorine gas contacting the heat transfer means are maintained at a molar ratio of about 0.01:1 to 12:1, and the heat transfer means is a refrigerating means having a refrigerant which has a temperature from −30° to +9°C.

4. A method as defined in claim 1, wherein gaseous chlorine, released from aqueous zinc chloride, is continuously fed into a hydrate-forming zone, water, in liquid form, is continuously fed into said zone, water vapor or gas is continuously formed by vaporization of the liquid water, chlorine hydrate is continuously formed, the feed of chlorine and the vaporization of water are regulated to maintain a molar ratio of about 1:1, and the heat removed by the refrigerating means and the feed of chlorine and vaporization of water being increased or decreased together to maintain said molar ratio.

5. The method of claim 1, wherein the concentration of zinc chloride ranges from above 10 percent by weight to about 35 percent by weight.

6. The method of claim 1, wherein the gaseous chlorine and water are obtained from an aqueous zinc chloride solution of a concentration of greater than 10 percent zinc chloride, with 0.1 to 4 volumes of chlorine dissolved and/or dispersed therein and the molar ratio of water and chlorine in gaseous form contacting the heat transfer means is from about 0.01 to 8:1.

* * * * *